March 1, 1927.
F. L. SCHLEY ET AL
AGRICULTURAL MACHINE
Filed Jan. 29. 1925
1,619,586
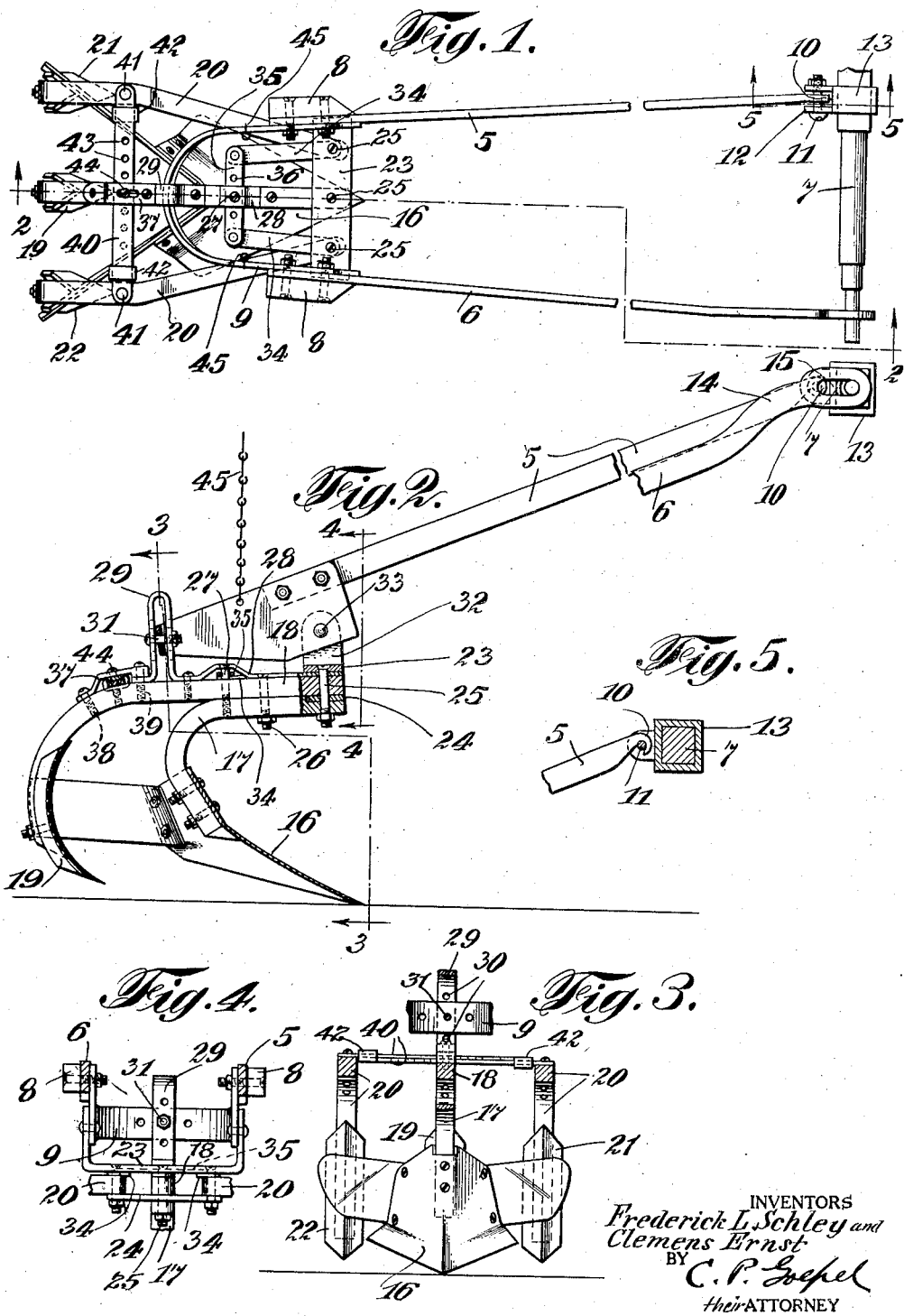
INVENTORS
Frederick L. Schley and
Clemens Ernst
BY C. P. Goepel
their ATTORNEY Patented Mar. 1, 1927.

1,619,586

UNITED STATES PATENT OFFICE.

FREDERICK L. SCHLEY AND CLEMENS ERNST, OF BROOKLYN, NEW YORK.

AGRICULTURAL MACHINE.

Application filed January 29, 1925. Serial No. 5,445.

This invention relates to agricultural machines and more particularly to a plow, cultivator, or similar earth working machine.

One of the important objects of the present improvements is to provide an improved draft connection between one or more plows or cultivators and the axle of a vehicle, whereby the earth working implements may readily accommodate themselves to unevenness of the land and whereby such movement of the implements, as may be necessary in order to escape or avoid rocks or other obstructions, may occur without liability of breaking or damaging the draft connections.

It is another important object of the invention to provide improved means for vertically adjusting the implements with respect to the draft means connecting the same with the vehicle axle, so that the soil may be plowed or cultivated to any desired depth.

It is also an additional object of the invention to provide means whereby the individual cultivators or plows may be relatively adjusted transversely and properly spaced from each other.

It is a further general object of the invention to provide an agricultural machine of the above character which is relatively simple and inexpensive in its construction, exceedingly durable and which will be found efficient in practical operation.

With the above and other objects in view, the invention consists in the improved agricultural machine and in the form, construction and relative arrangement of its several parts as will be hereinafter more fully described, illustrated in the accompanying drawings and subsequently incorporated in the subjoined claims.

In the drawing wherein we have shown one simple and practical embodiment of the invention and in which similar reference characters designate corresponding parts throughout the several views, Figure 1 is a plan view illustrating a preferred form of my present improvements, Figure 2 is a side elevation partly in section, Figure 3 is a transverse section taken on the line 3—3 of Figure 2, Figure 4 is a sectional view taken on the line 4—4 of Figure 2, and Figure 5 is a detail sectional view taken on the line 5—5 of Figure 1.

Referring in detail to the drawing, 5 and 6 designate two draft bars which extend rearwardly from the vehicle axle 7. The vehicle may be either horse driven or motor driven. The draft bars 5 and 6 extend rearwardly and downwardly from the axle in convergent relation to each other and at their rear ends are suitably reinforced, as at 8, and rigidly bolted or otherwise connected to the respective arms of a U-shaped plate or yoke 9. As seen in Figure 2 of the drawings, these yoke arms, at their forward ends, are relatively wide and project downwardly below the draft bars for a purpose which will presently appear.

The forward end of the draft bar 5 is formed with a hook 10, which is adapted to be engaged over the bolt 11, mounted in spaced lugs 12 on a sleeve or collar 13, fixed upon the axle 7. It will be noted that this hook 10 on the draft bar 5 may have a limited shifting longitudinal movement on the bolt 11 between the lugs 12. The forward end of the other draft bar 6 terminates in an upwardly curved portion 14 having an elongated slot 15 extending longitudinally thereof, and through which the spindle of the axle 7 projects. The purpose of this arrangement will be hereinafter described.

In the illustrated construction, we show a plow blade 16 of any approved standard form which is fixed upon the downwardly and forwardly projecting rear end of a beam 17. This beam extends longitudinally along the under side of a relatively long longitudinally disposed beam 18 having its rear end downwardly curved and carrying thereon a cultivating shovel 19. Additional beams 20 are arranged at the opposite sides of the central beam 18 and likewise carrying cultivating shovels 21 and 22 respectively at their rear ends. The forward ends of the beams 18 and 20 are positioned between upper and lower transverse metal bars 23 and 24 respectively and pivoted thereto by bolts 25. The bolt 25 securing the central beam 18 also extends through and secures the forward end of the beam 17 to the under side of the bar 24. The beams 17 and 18 are additionally secured to each other by bolts 26 and 27. These bolts also serve to fix the longitudinally extending strap 28 upon the upper side of the beam 18, the part of said strap through which the bolt 27 extends, being spaced from the surface of the beam, while the forward end of said strap is interposed between the bar 23 and the beam 18. At its rear end, strap 25 is formed into a vertically disposed loop 29, the parallel parts of which are provided with a series of longitudinally spaced openings 30 therein. In this loop the intermediate portion of the metal yoke plate 9 is engaged for vertical movement, said plate having an opening adapted to be positioned in coinciding selected relation with the openings 30 to receive a bolt 31, whereby the several beams and earth working implements are sustained in adjusted relation to said yoke plate and the draft bars 5 and 6.

The opposite ends of the bar 23 are provided with upwardly extending ears 32 which are pivotally connected as at 33 to the forward ends of the yoke plate 9. The bolts 25 extending through the forward ends of the beams 20 also fix the forward ends of the rearwardly extending metal bars 34 between the bar 23 and said beams. The rear ends of these bars 34 are connected by a transverse bar 35 extending between the strap 28 and the beam 18, said connecting bar having a series of spaced openings 36 therein to adjustably receive the bolt 27.

Rearwardly of the vertical loop 29, a bridge plate 37 is spaced above the beam 18 and fixed at its rear end thereto by a suitable screw 38, the forward end of said bridge piece and the end of the metal strap 28 being fixed to said beam by the screw 39. Between said bridge piece and the beam 18, the relatively slidable bars 40 are engaged, each of said bars being pivotally connected at one of its ends, as at 41, to one of the side beams 20, and having a flat sleeve 42 formed on its other end and loosely engaged around the other of said bars. These slidably engaged bars are provided with longitudinally spaced openings 43 therein to receive a screw 44, which is extended through selected coinciding openings in said bars and threaded into the beam 18. Thus it will be evident that by means of this screw, the several implement carrying beams may be fixed and held in any desired transversely spaced adjusted relation. Also, by removing the screw 44, and screw 27, the central implement carrying beam may be adjusted to any desired position with respect to either of the side beams 20.

In the accompanying drawing, we have shown the machine as arranged for plowing, and it will be noted that when the plow 16 is used, the cultivator shovels 19 are positioned rearwardly of the plow and above the ground so that they do not engage therewith. The depth to which the plow shall enter the soil may be varied or regulated by removing the bolt 31 and adjusting the beams 17 and 20 vertically with respect to the yoke plate 9, said beams swinging from the pivotal connections 33 with the forward ends of said yoke plate. The bolt 31 is then reinserted through the coinciding openings in the yoke plate and the vertically disposed loop 29, whereby the plow will be sustained in its adjusted position with relation to the draft bars 5 and 6. Also, due to the sliding connection of the forward end of the draft bar 6 with the spindle of the vehicle axle 7 and the loose connection of the draft bar 5 with the collar 13, in the event that the plow share should strike a large stone or other obstruction, it will yield under the abnormal resistance and shift transversely so as to safely pass such obstruction and direct the same to one side of the furrow.

A suitable chain or other flexible lifting element, indicated at 45, is connected to the opposite sides of the yoke plate 9 and to suitable lifting means mounted on the vehicle, whereby, when desired, the plow may be lifted or elevated from the soil to an inoperative position.

In cultivating, the plow 16 and its beam 17 are removed by removing the bolts 25, 26 and 27. The cultivator beams are then vertically adjusted by bolt 31 with respect to the yoke plate 9 so that the transversely spaced shovels will properly engage in the soil between the plant rows. It will thus be understood that the machine is easily and quickly convertible for use either in plowing or cultivating.

From the foregoing description, considered in connection with the accompanying drawing, the construction, manner of operation and the several advantages of our present improvements will be clearly understood. It will be seen that we have devised a combined plowing and cultivating machine of very durable and simple construction, and in which the draft connections, which we provide, obviate liability of serious damage or injury to the earth working implements. Also, it is possible to very easily and quickly adjust the transverse spaced relation of the several cultivator shovels in accordance with the spacing of the plant rows. In the foregoing description and accompanying drawing, we have illustrated an embodiment of our present improvements which will be highly efficient and reliable in practical operation. Nevertheless, it is possible that the advantageous results herein referred to may be attained by means of other alternative structures, and we accordingly reserve the privilege of resorting to all such legitimate changes in the form, construction and relative arrangement of the several parts as may be fairly embodied within the spirit and scope of the invention as claimed.

We claim:—

1. In an agricultural machine, a yoke member adapted to have connection to a draft means, an implement beam having pivotal support from the yoke member, a guide member on the implement beam engaging about said yoke, and means for adjustably connecting said yoke to said guide member whereby to hold the implement beam in an adjusted angular position.

2. In an agricultural machine, spaced draft bars, a yoke plate connecting said bars at their rear ends, an earth working implement having a beam, means for pivotally sustaining said beam at its forward end from said yoke plate, a vertically disposed member connected with the said beam and engaged by the intermediate portion of the yoke plate for vertical movement relative thereto and means for adjustably connecting said yoke plate with said member to sustain said implement and the beam in an adjusted position.

3. In an agricultural machine, spaced draft bars, a yoke plate connecting said bars at their rear ends, an earth working implement having a beam, means for pivotally sustaining said beam at its forward end from said yoke plate, a vertically disposed loop connected with said beam, the intermediate portion of the yoke plate being vertically movable in said loop, and means for adjustably securing the said loop and yoke plate with each other against relative movement to maintain the earth working implement in an adjusted position.

4. In an agricultural machine, a yoke member adapted to have connection to a draft means, an implement beam pivotally supported from said yoke member, a loop strap secured to said beam and having a loop portion for guiding a portion of the yoke member, and means for securing said yoke beam to the guide loop.

5. In an agricultural machine, spaced draft bars, a yoke connecting said draft bars at their rear ends, a plurality of implement carrying beams, means for pivotally suspending said beams at their forward ends from the yoke plate, said means including spaced transverse bars, one of said bars being pivotally suspended at its ends from the yoke plate, bolts pivotally securing the forward ends of the beams between said transverse bars, and adjustable means connecting said beams with each other adjacent their rear ends for transversely spacing said rear ends of the beams from each other to position the implements with respect to the line of draft.

6. In an agricultural machine, spaced draft bars, a yoke connecting said draft bars at their rear ends, a plurality of implement carrying beams, means for pivotally suspending said beams at their forward ends from the yoke plate, said means including spaced transverse bars, one of said bars being pivotally suspended at its ends from the yoke plate, bolts pivotally securing the forward ends of the beams between said transverse bars, a member fixed to one of said beams engaged with the intermediate portion of the yoke plate, and means for adjustably connecting said member to the yoke plate to vertically position the implements relative to the ground.

7. In an agricultural machine, spaced draft bars, a yoke plate connecting said bars at their rear ends, a plurality of cultivator shovel carrying beams, a plow beam engaged on the under side of one of said cultivator beams, means detachably securing said last named beams to each other, means for pivotally suspending said cultivator and plow beams at their forward ends from said yoke plate, and means for adjustably sustaining beams at their forward ends from said yoke plate, whereby the cultivator shovels may be sustained in an inoperative position above the ground surface in the use of the plow, or said shovels lowered into engagement with the ground when the plow beam is detached.

In testimony that we claim the foregoing as our invention, we have signed our names hereto.

FREDERICK L. SCHLEY.
CLEMENS ERNST.